US010255651B2

(12) United States Patent
Fabius

(10) Patent No.: US 10,255,651 B2
(45) Date of Patent: Apr. 9, 2019

(54) METHODS AND SYSTEMS FOR GENERATING SHADERS TO EMULATE A FIXED-FUNCTION GRAPHICS PIPELINE

(71) Applicant: Channel One Holdings Inc., Tampa, FL (US)

(72) Inventor: Aidan Fabius, Toronto (CA)

(73) Assignee: Channel One Holdings Inc., Tampa, FL (US)

( * ) Notice: Subject to any disclaimer, the term of this patent is extended or adjusted under 35 U.S.C. 154(b) by 0 days.

(21) Appl. No.: 14/687,517

(22) Filed: Apr. 15, 2015

(65) Prior Publication Data

US 2016/0307364 A1 Oct. 20, 2016

(51) Int. Cl.
| | | |
|---|---|---|
| *G06T 1/00* | (2006.01) |
| *G06T 1/20* | (2006.01) |
| *G06T 15/00* | (2011.01) |
| *G06F 8/36* | (2018.01) |

(52) U.S. Cl.
CPC .............. *G06T 1/20* (2013.01); *G06T 15/005* (2013.01); *G06F 8/36* (2013.01)

(58) Field of Classification Search
CPC ...................................... G06T 15/80
USPC ........................................ 345/426
See application file for complete search history.

(56) References Cited

U.S. PATENT DOCUMENTS

| | | | |
|---|---|---|---|
| 5,798,770 A | 8/1998 | Baldwin | |
| 6,268,875 B1 | 7/2001 | Duluk, Jr. et al. | |
| 7,015,909 B1 | 3/2006 | Morgan, III et al. | |
| 7,324,106 B1* | 1/2008 | Cabral | G06F 8/441 345/426 |
| 7,463,259 B1 | 12/2008 | Kolb et al. | |
| 7,750,913 B1* | 7/2010 | Parenteau | G06F 8/30 345/426 |
| 8,004,523 B1 | 8/2011 | Cabral et al. | |
| 8,203,566 B2 | 6/2012 | Abdo et al. | |
| 8,495,602 B2 | 7/2013 | Chen et al. | |
| 8,537,169 B1 | 9/2013 | Bolz et al. | |
| 2005/0088440 A1* | 4/2005 | Sloan | G06T 15/55 345/426 |
| 2006/0082577 A1* | 4/2006 | Carter | G06T 15/50 345/426 |
| 2009/0040222 A1* | 2/2009 | Green | G06T 15/80 345/426 |
| 2009/0231332 A1 | 9/2009 | Woo et al. | |
| 2010/0214294 A1* | 8/2010 | Li | G06T 17/20 345/423 |

(Continued)

FOREIGN PATENT DOCUMENTS

| | | |
|---|---|---|
| EP | 1485874 | 12/2004 |
| EP | 1847966 | 10/2007 |

(Continued)

*Primary Examiner* — Hai Tao Sun
(74) *Attorney, Agent, or Firm* — Woods Oviatt Gilman LLP; Dennis B. Danella, Esq.

(57) ABSTRACT

Methods, systems, and computer-readable media for rendering graphics using a graphics pipeline for emulating a fixed-function graphics pipeline, including selecting a first pre-compiled shader chunk from a set of pre-compiled shader chunks, selecting at least one second pre-compiled shader chunk from the set of pre-compiled shader chunks, and, concatenating the first shader chunk with the at least one second shader chunk, wherein each shader chunk corresponds to a fixed-function graphics function.

14 Claims, 7 Drawing Sheets

(56) References Cited

U.S. PATENT DOCUMENTS

2011/0279473 A1  11/2011  Cabral et al.
2014/0354658 A1  12/2014  Dotsenko et al.

FOREIGN PATENT DOCUMENTS

WO   2000030040   5/2000
WO     02101649  12/2002

* cited by examiner

700

```
IF mvp_matrix is the identity matrix THEN
    InsertChunk(outputPosition.xyz = inputPosition.xyz)

ELSE mvp_matrix is non-identity
    InsertChunk(outputPosition.x = inputPosition.xyz DOT mvp_matrix[0]
                outputPosition.y = inputPosition.xyz DOT mvp_matrix[1]
                outputPosition.z = inputPosition.xyz DOT mvp_matrix[2])

IF lighting is disabled THEN
    InsertChunk(outputColor.rgb = inputColor.rgb)

ELSE lighting is enabled
    InsertChunk(eyeNorm.x = inputNormal.xyz DOT invmv_matrix[0]
                eyeNorm.y = inputNormal.xyz DOT invmv_matrix[1]
                eyeNorm.z = inputNormal.xyz DOT invmv_matrix[2]
                outputColor.rgb = matEmis.rgb + (matAmb.rgb * sceneAmb.rgb)

IF ambient light is enabled
        InsertChunk(outputColor.rgb += matAmb.rgb * lightAmb.rgb)

IF diffuse light is enabled
        InsertChunk(lDotN = lightDir.xyz DOT eyeNorm.xyz
                    temp.rgb = lDotN * matDiff.rgb
                    outputColor.rgb += temp.rgb * lightDiff.rgb)

IF specular light is enabled
        InsertChunk(sDotN = lightHalfVec.xyz DOT eyeNorm.xyz
                    sDotN = LOG(sDotN)
                    sDotN = matShine * sDotN
                    sDotN = EXP(sDotN))
                    temp.rgb = sDotN * matSpec.rgb
                    outputColor.rgb += temp.rgb * lightSpec.rgb)
```

FIG. 7

METHODS AND SYSTEMS FOR GENERATING SHADERS TO EMULATE A FIXED-FUNCTION GRAPHICS PIPELINE

TECHNICAL Field

The embodiments disclosed herein relate to shader code and shader programs (shaders) used in rendering computer graphics and, in particular, to methods and systems for generating shaders to emulate the fixed-function graphics pipelines of a Graphics Processing Unit (GPU) in safety-critical graphics applications such as aviation.

INTRODUCTION

The following paragraphs are not an admission that anything discussed in them is prior art or part of the knowledge of persons skilled in the art.

Computer graphics objects are generally rendered in real time from model data using a graphics pipeline or rendering pipeline.

Traditionally, fixed-function graphics pipelines are implemented using dedicated graphics hardware. For example, a fixed-function graphics Application Programming Interface (API) could be used, in which the API function calls mapped directly to logical operations built in the dedicated graphics hardware. Typically, in such a case, in order to render a desired graphics object or image, model data is passed sequentially through the fixed-function graphics pipeline, since the pipeline is pre-determined by the dedicated graphics hardware. In this way, fixed-function graphics pipelines can be seen as lacking flexibility for graphics applications.

The limited nature of a fixed-function graphics pipeline is advantageous to safety-critical applications like avionics as it allows exhaustive coverage testing of each stage of the pipeline and the fixed-functionality graphics API.

Following the development of fixed-function graphics pipeline GPUs, modern programmable GPUs have been developed. These GPUs can be programmed using shaders.

The term "GPU", as used herein, broadly refers to any graphics rendering device. This may include, but is not limited to discrete GPU integrated circuits, field-programmable gate arrays (FPGAs), application-specific integrated circuits (ASICs), discrete devices otherwise operable as central processing units, and system-on-a-chip (SoC) implementations. The term "CPU", as used herein, broadly refers to a device with the function or purpose of a central processing unit, independent of specific graphics-rendering capabilities, such as executing programs from system memory. In some implementations, it is possible that a SoC may include both a GPU and a CPU; in which case the SoC may be considered both the GPU and the CPU.

Implementation of shaders may be done using known standards and graphics languages, such as DirectX®, OpenGL®, and others. Typically, the source code from a shading language is stored within an application itself, or elsewhere in a file on a computer system storage medium such as a hard disk. The inclusion of source code in this way may be done for various reasons, including making shader functionality somewhat independent of a particular type of GPU. In this way, the shader source code may be run-time compiled into shader machine code for the particular GPU on which it will run. In such a case, when the shader source code has been compiled at run time, it may be loaded for use by the GPU.

The compiled shader code can use inputs such as vertex coordinates, surface normals, texture coordinates, and lighting in order to output transformed spatial coordinates (e.g. XYZ coordinates), color (e.g. RBGA), and texture coordinates, thereby defining the graphics object such that it can be properly displayed as a 2D image by the computer system.

The use of shaders and programmable graphics hardware rather than fixed-function graphics pipelines has become commonplace in commercially-available GPUs. As such, GPUs with programmable graphics hardware, using shaders, generally have significant cost and performance benefits, since these GPUs are produced in large volumes, using advanced technology.

Traditionally, in order to obtain the cost and performance benefits of advanced GPU technology, it has been necessary to generate run-time compiled shader programs for programmable graphics hardware by relying on shader source code within an application. Run-time compiled shader programs are generally difficult or impossible to verify or certify in regards to safety-critical standards.

SUMMARY OF VARIOUS EMBODIMENTS

According to some embodiments, methods, systems, and non-transitory computer-readable media are described herein for rendering graphics using a shader program for emulating a fixed-function graphics pipeline on programmable graphics hardware.

According to some embodiments, the method utilizes the selection of pre-compiled shader chunks from a set of pre-compiled shader chunks. Each shader chunk corresponds to a fixed-function graphics function. If more than one pre-compiled shader chunk is selected, then selected pre-compiled shader chunks are subsequently concatenated in an order emulating the stages of a traditional fixed function pipeline.

The pre-compiled shader chunks may be selected from a set of pre-compiled shader chunks according to the requirements of a specific graphics operation that is to be performed by a GPU. For example, the requirements may be determined by a particular application and/or user input.

The shader chunks can be organized and concatenated by shader type and shader instruction type. For example, some or all of the shader chunks pertaining to the arithmetic logic unit (ALU) shader instruction type for a fetch shader may be concatenated together. This may be followed by pre-compiled shader chunks pertaining to the vertex shader instruction type. Subsequent to the vertex shader, concatenated pre-compiled shader chunks for a pixel shader (also known as fragment shader) may be grouped and concatenated together.

When the graphics pipeline of pre-compiled shader chunks has been assembled, the pipeline may be used to render graphics objects. For example, model data may be provided as input to the graphics pipeline, which may render a graphics object as an output of the graphics pipeline.

According to another embodiment, described herein, is a system for rendering graphics. The system comprises non-transitory computer-readable media for storing a set of pre-compiled shader chunks. The system further comprises a processing unit, such as a GPU or CPU. The processing unit is configured to select particular pre-compiled shader chunks from the set of pre-compiled shader chunks. The selected pre-compiled shader chunks are then concatenated, which generates a shader program to emulate a fixed-function graphics pipeline, for example, as might be executed using a programmable graphics pipeline.

In some instances, the shader chunks can be organized and concatenated by shader type and shader instruction type.

There may be situations in which it is desirable to generate a shader program using pre-compiled shader chunks such that the shader program does not include branches or loops.

According to another embodiment, described herein, is a non-transitory computer-readable medium for storing a shader program. The shader program can be used to configure a GPU. In particular, the shader program comprises a concatenation of pre-compiled shader chunks.

The pre-compiled shader chunks can be organized and concatenated by shader type and shader instructions type. Furthermore, the pre-compiled shader chunks can be implemented such that they do not include any branches or loops.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatus or processes will be described below to provide an example of one or more embodiments. No embodiment described below limits any claimed embodiment and any claimed embodiment may cover processes or apparatus that differ from those described below. The claimed embodiments are not limited to apparatus or processes having all of the features of any one apparatus or process described below or to features common to multiple or all of the apparatus described below. It is possible that an apparatus or process described below is not an embodiment of any claimed embodiment. Any embodiment disclosed below that is not claimed in this document may be the subject matter of another protective instrument, for example, a continuing patent application, and the applicants, inventors or owners do not intend to abandon, disclaim or dedicate to the public any such embodiment by its disclosure in this document.

Figure 1:
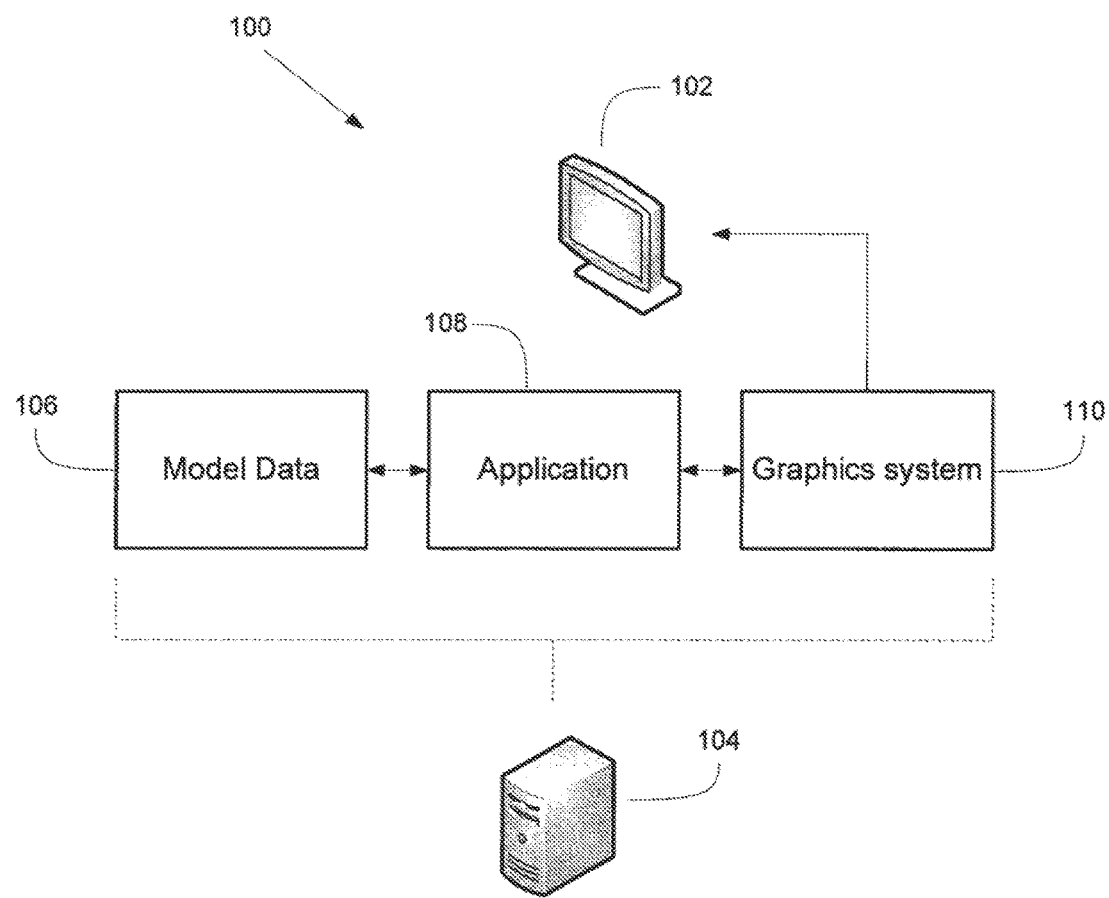
FIG. 1 is a schematic diagram of a computer graphics system diagram according to one embodiment.

Referring now to FIG. 1, illustrated therein is a system 100 according to some embodiments. The system comprises a computer display or monitor 102 and a computer 104. Other components of the system are not shown, such as user input devices (e.g. a mouse, a keyboard, etc.). Generally the system 100 may be used for displaying graphics object or images on the monitor 102.

According to some embodiments, the system 100 may be a computer system used in a motorized vehicle such as an aircraft, marine vessel, or rail transport vehicle, or in a medical imaging system, a transportation system, or any other system that uses a computer and monitor.

The computer 104 may generally include system memory, storage media, and a processor. In some cases, the computer 104 may also include dedicated graphics hardware, which may include a GPU and video memory. In other cases, the computer 104 may perform at least some graphics-related operations using a CPU and system memory.

According to some embodiments, the system 100 may be a safety-critical, mission-critical, or high-reliability system. In such a case, the system 100 may be required to comply with specific operating standards, such as standards related to reliability and fault tolerance.

For example, the system 100 may be an embedded system for use in a safety-critical environment. In such a case, if the system 100 includes an inline shader compiler (for example, embedded in a driver) and/or a real-time code generating tool (for example, a pre-compiled shader-chunk graphics pipeline builder or an on-the-fly graphics pipeline builder), the system 100, including the shader compiler, may require verification and/or certification in order to be used within a regulatory regime.

For example, a real-time inline compiler and/or a real-time airborne code-generating tool may require verification and certification according to the DO-178 or DO-330-related documents defined by the Radio Technical Commission for Aeronautics. Certification for a real-time inline compiler and/or a real-time airborne code-generating tool may be required in order to satisfy aviation authorities of a particular country.

Certifying an inline compiler may represent a significant task in some cases. Thus, rather than certifying an inline compiler, an alternative approach is to utilize an in-flight code-generation tool in place of an inline compiler, since the certification of the in-flight code-generation tool may be significantly less burdensome than certifying an inflight compiler.

In order to display a rendering of the model data 106 on the monitor 102, such as may be determined by an application 108, the model data 106 must first be processed by a graphics system 110. The graphics system may receive the model data 106 and may also receive instructions from the application 108 as to how the model data 106 should be processed.

The graphics system 110 may include any or all of a GPU and video memory; and it may use any or all of the CPU and system memory as well.

Figure 2:
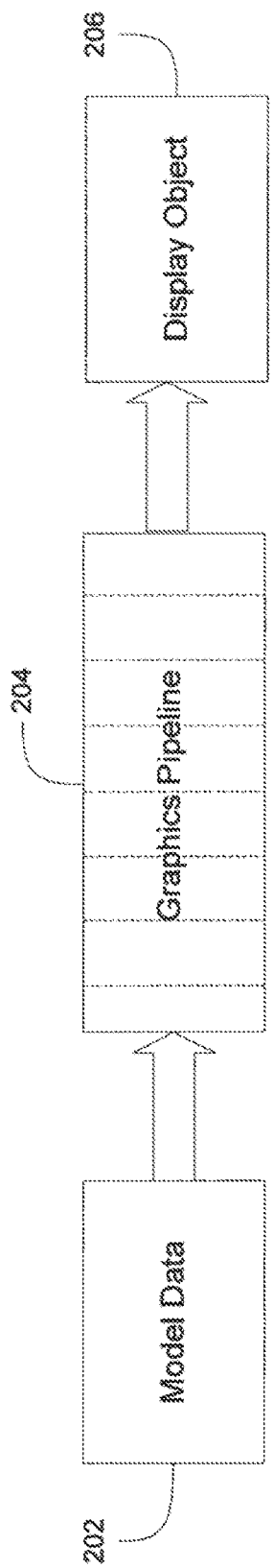
FIG. 2 is a flow diagram depicting a graphics pipeline according to some embodiments.

The rendering of model data into a display object using a pipeline is shown in FIG. 2. The graphics pipeline 204 takes the model data 202 as input, and renders the display object 206 as output. The output of the graphics pipeline 204 may, for example, be stored in a video buffer before being displayed by a monitor.

According to some embodiments, model data 202 may include vertices, which may be stored in one or both of video memory and system memory.

The graphics pipeline 204 may be a fixed-function graphics pipeline using dedicated graphics hardware and a corresponding API. In such a case, the graphics pipeline 204 may readily satisfy verification and certification requirements of a regulatory regime, since the fixed-function graphics pipeline can be coverage-tested due to the limited nature of the fixed-function graphics API.

In other words, when the graphics pipeline 204 is a fixed-function graphics pipeline, it does not implement a run-time compiled shader program or real-time code-generation tool. In such a case, it may be difficult to obtain the cost or performance benefits of advanced graphics technology, since, generally speaking, fixed-function hardware is limited in its graphics processing power and is becoming less commercially available in the mainstream.

Alternatively, the graphics pipeline 204 may be a programmable graphics pipeline that can be programmed through an API using shaders. The use of a programmable graphics pipeline may coincide with the implementation of advanced graphics technology, for example, to take advantage of performance benefits (e.g., speed, instruction sets, etc.) and cost benefits (since GPUs with programmable graphics pipelines may be produced in higher quantities and therefore at lower costs).

In the case of a programmable graphics pipeline, the shader source code may be stored in an application, and may be compiled at run time into machine code, such as with an inline compiler that is built into a device driver for the graphics hardware. In such a case, it may be difficult to obtain verification and certification, due to the complex nature of a full graphics shader compiler. Furthermore, some shading languages provide for code containing loops and branches, which can add further complexity to the verification and certification processes.

According to some embodiments, the graphics pipeline 204 may be assembled using an inflight code-generation tool that utilizes pre-compiled shader chunks that emulate the functions of a fixed-function graphics pipeline, and which can be used on a GPU that uses a programmable graphics pipeline. (Here, the term "assembled" is not necessarily being used in the sense of an "assembler" program that translates an assembly language into machine language; though the shader chunks themselves are pre-compiled).

As used here, the term "pre-compiled shader-chunk graphics pipeline" refers to graphics pipelines as disclosed herein, which may be assembled from pre-compiled shader chunks. Since, in some cases, a pre-compiled shader-chunk graphics pipeline may be assembled using a code-generation tool in real time, a pre-compiled shader-chunk graphics pipeline may also be referred to as an "on-the-fly shader-chunk graphics pipeline" or simply as an "on-the-fly graphics pipeline".

Figure 3A:
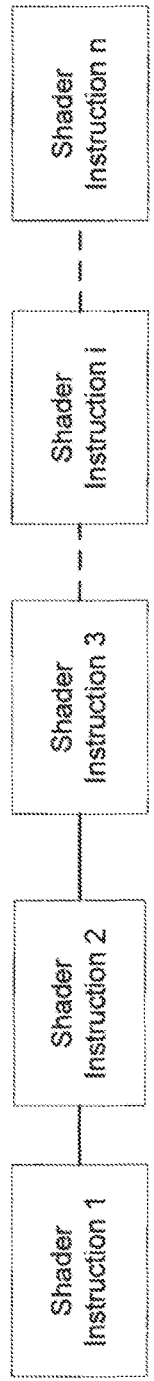
FIG. 3A is a block diagram showing the arrangement of shader instructions in a graphics pipeline according to one embodiment.

Referring to FIG. 3A, there is shown a series of n shader instructions. In the case that pipeline 204 is a programmable graphics pipeline, then the shader instructions 1 to n may be determined by a particular rendering task, for example, as determined by the application. For example, particular shader instructions 1 to n might be linked into a shader program, and then run-time compiled in order to produce the particular shader program machine code that is used to operate the GPU for the particular rendering task.

According to some embodiments, the graphics pipeline 204 may be assembled using pre-compiled shader chunks. For example, a particular application may be known to rely on a fixed number of known shader instructions. Furthermore, a particular GPU may be known to be used in the system on which the particular application is running.

In such a case, it is possible to select the known shader instructions on which the application relies, and to group them into shader chunks. For example, referring to FIG. 3A and FIG. 3B, a set number of shader instructions numbered 1 to n may be known to satisfy the requirements of a particular application. It may be possible to group these shader instructions, such as shader instructions A, C, and E. (Where A, C, and E in FIG. 3B may correspond to any particular numbers 1 to n in FIG. 3A).

According to some embodiments, shader instructions may be grouped by shader instruction type. For instance, one specific example could include approximately 25 sets of fetch instructions, 50 sets of vertex instructions, and 30 sets of fragment instructions. Any or all of these instructions may be grouped together, by instruction type, depending on the particular application and particular GPU being used.

Figure 3B:
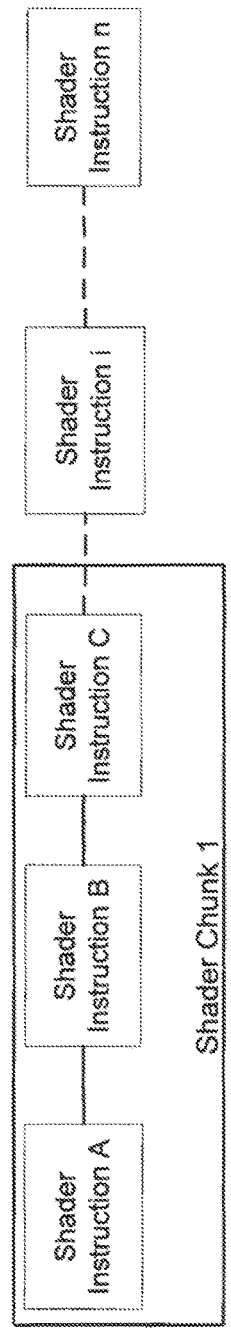
FIG. 3B is a block diagram showing the arrangement of shader instructions and a pre-compiled shader chunk in a graphics pipeline according to one embodiment.

Once the desired shader instructions have been grouped (such as A, C, and E in FIG. 3B), the shader instructions are concatenated to form a shader chunk, such as Shader Chunk 1 in FIG. 3B. In this way, a shader chunk can be constructed that provides a set of shader operations that, together, provide a low-level function across vertices or pixels, which may be performed in parallel. According to some embodiments, the shader chunks are independent, and, depending on a particular API or GPU, may form the building blocks of shaders.

After specific shader instructions have been selected, grouped, and concatenated according to a particular application and/or the resulting shader chunks can be compiled for a particular GPU. The compiling of the shader chunks differs from the run-time compilation of programmable graphics pipeline, in that, the shader chunks are not compiled each and every time a new graphics program is derived in real time. Rather, the shader chunks can be pre-compiled once, and built into a graphics driver. For each combination of particular application, API, and GPU, a set of pre-compiled shader chunks can be created, each performing a specific low-level function.

Figure 3C:
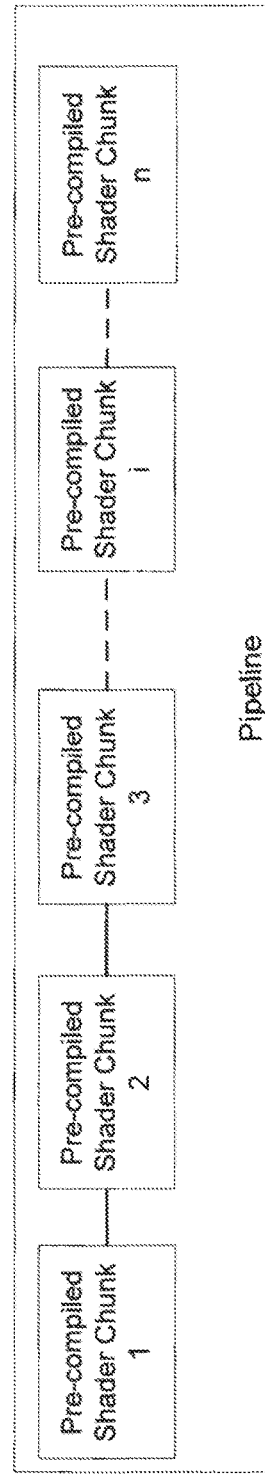
FIG. 3C is a block diagram showing the arrangement of pre-compiled shader chunks in a graphics pipeline according to one embodiment.

Referring to FIG. 3C, pre-compiled shader chunks can be selected from the set of pre-compiled shader chunks. For example, in order to construct a particular pipeline, shader chunks numbered 1 to n may be selected from the set of pre-compiled shader chunks. As shown in FIG. 3C, the selected shader chunk may be concatenated into a pipeline. In other words, the pre-compiled shader chunks can be used to assemble shaders on the fly, without the need for run-time compilation of the shaders.

According to some embodiments, the graphics pipeline of FIG. 3C may be used as a GPU program by a GPU with a programmable graphics pipeline. In this case, since the shader chunks have been pre-compiled and assembled using a real-time code generation tool, an inline shader compiler is not required. Furthermore, in this case, the pre-compiled shader chunks do not include the branches or loops that might otherwise be present in a run-time-compiled shader program. Therefore, according to some standards, the shaders-on-the-fly technique, using pre-compiled shader chunks, may simplify the verification or certification process.

Figure 4:
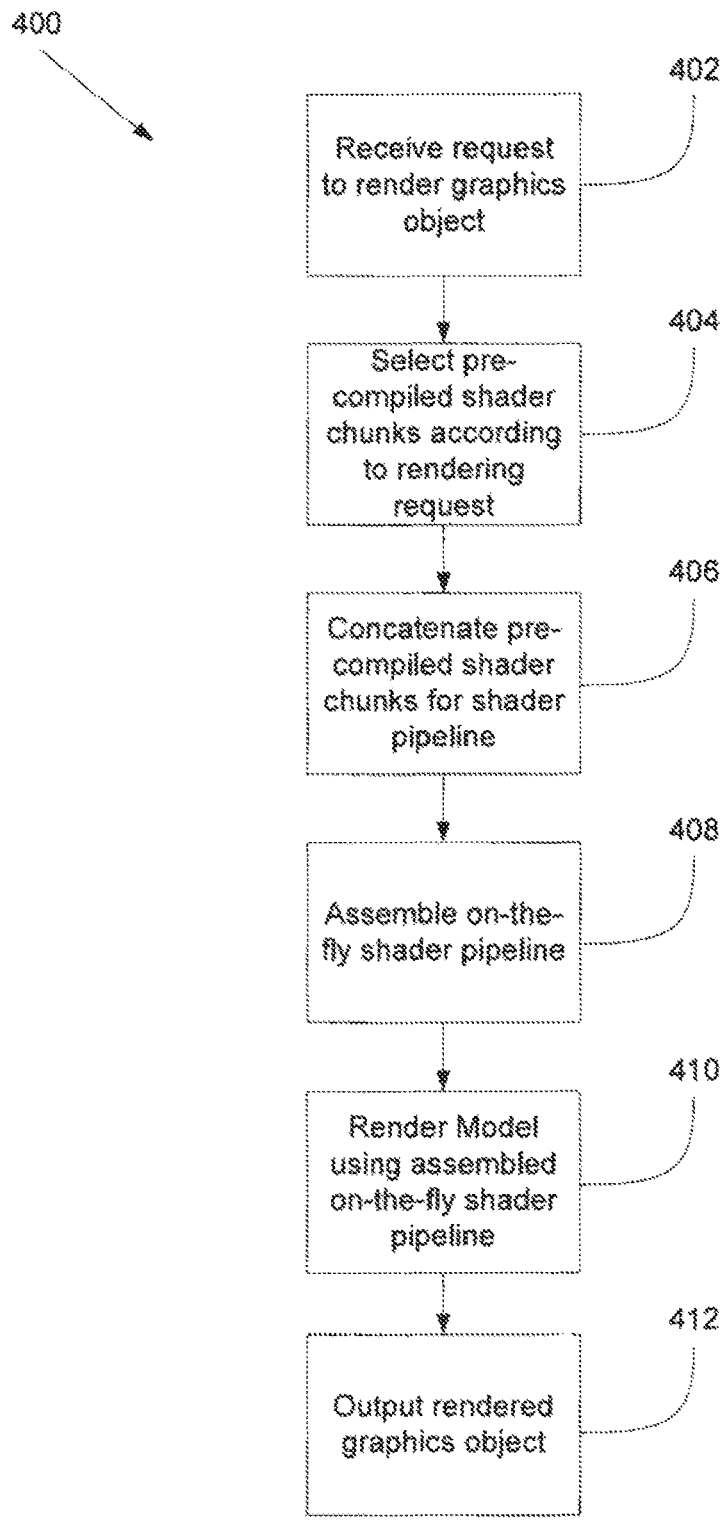
FIG. 4 is a flow diagram of a method for rendering graphics using a pipeline of pre-compiled shader chunks according to one embodiment.

Referring to FIG. 4, there is shown a method 400 of rendering graphics using an on-the-fly graphics pipeline.

As used herein, the term "processing unit" broadly refers to both a GPU and CPU as defined herein; and a plurality of processing units may include a combination of both GPUs and CPUs. For example, in some embodiments, certain steps in the method, such as selecting and concatenating pre-compiled shader chunks may be performed by a CPU, while other steps, such as rendering graphics using an assembled on-the-fly graphics pipeline may be performed by a GPU.

At 402, a processing unit receives a request to render a graphics object. The request to render a graphics object may pertain to graphics functions, for example, spatial coordinates, color, and texture coordinates.

At 404, pre-compiled shader chunks are selected in accordance with the rendering request that was received.

For example, in order to render a specific graphics object from a model, it may be necessary to use shader instructions pertaining to any one of a model-view-projection (MVP) transformation, or lighting (e.g. ambient light, diffuse light, specular light, etc.). This example is illustrated in the pseudo-code script shown in FIG. 7.

In this example, pre-compiled shader chunk selection is accomplished with a script comprising cascaded conditional logic statements. For example, if an MVP transformation is required, then appropriate shader chunks corresponding to the MVP matrix transformation are inserted.

Similarly, if lighting is enabled, then, in the example shown in FIG. 7, a pre-compiled shader chunk may be inserted that includes the required spatial translation and color mapping shader instructions.

Furthermore, additional lighting-related operations may be required, such as those pertaining to ambient light, diffuse light, and specular light. As provided in the example of FIG. 7, if any of these operations are required, then corresponding pre-compiled shader chunks that include the necessary shader instructions are selected with an "if" statement. Otherwise, the pre-compiled shader chunks are not inserted into the pipeline.

According to the example, if lighting is disabled, then a chunk is inserted such that no lighting shader instructions are included (e.g. an identity or null transformation, as the case may be). According to some embodiments, if lighting is disabled, then no shader chunks pertaining to lighting instructions are inserted.

Referring again to FIG. 4, at 406, a selected pre-compiled shader chunk is concatenated with a previously-selected shader chunk. For example, if lighting is enabled, which includes ambient light enabled and specular light enabled, then, the ambient light pre-compiled shader chunk would be concatenated with the previous lighting chunk, and, subsequently, the specular light chunk would then be concatenated with the ambient light chunk.

In some cases, for example, depending on the API and shaders used, it may be necessary to include process and flow control instructions interspersed among the shader instructions provided by pre-compiled shader chunks. In such a case, the concatenated pre-compiled shader chunks may include process/flow control instructions along with shader instructions. Alternatively, the pre-compiled shader chunks may include only shader instructions, and the process/flow control instructions may be separately included within the concatenated pre-compiled shader chunk graphics pipeline.

The process/flow control instructions generally will not include branches and loops, due to the nature of process/flow control instructions.

At 408, the on-the-fly graphics pipeline is assembled into a program, such as a GPU program. (Here, the term "assembled" is not necessarily being used in the sense of an "assembler" program that translates an assembly language into machine language; though the shader chunks themselves are pre-compiled). This step may be determined by the particular standard or shading language that is being used.

At 410, the model is rendered using the assembled on-the-fly shader pipeline. At 412, the rendered graphics object is output. The output may, for example, be stored in a video buffer before being displayed by a monitor.

In certain situations, it may be necessary to structure the GPU program so that it includes one of a pre-defined type of shader. For example, in some cases, it may be necessary to ensure that there is one each of a fetch shader, a vertex shader, and a pixel shader within the GPU program. In other cases, different types of pixel shaders may be required. It may be necessary to ensure that the pre-compiled shader chunks are placed in a particular order as determined by shader type (e.g. "fetch", followed by "vertex", followed by "fragment" or "pixel"). Other types of shaders may also be required, or may be optionally used, such as geometry shaders, tessellation shaders, etc.

Figure 5:
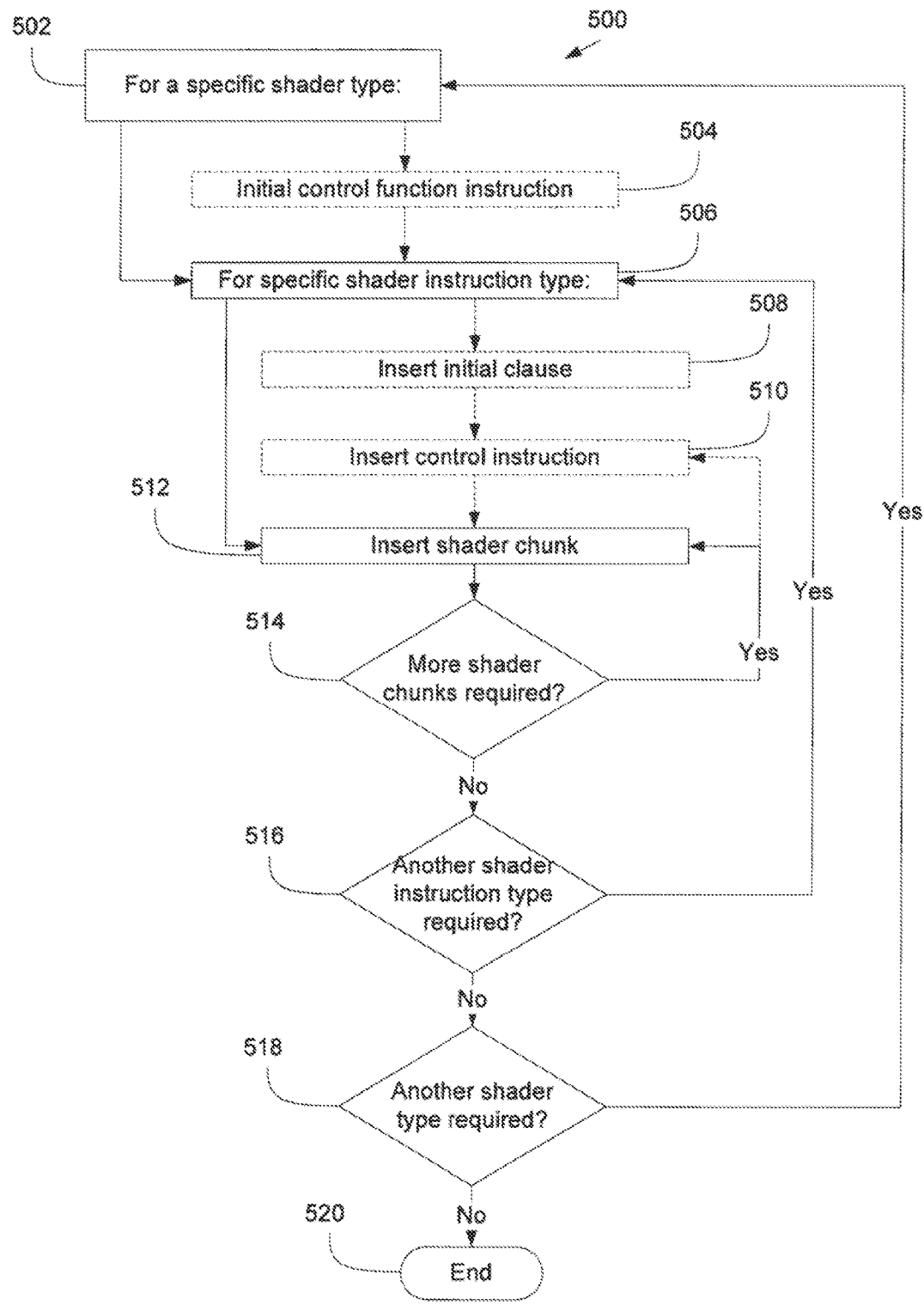
FIG. 5 is a flow diagram of a method for assembling a GPU program using a pipeline of pre-compiled shader chunks according to one embodiment.

Some embodiments of concatenating pre-compiled shader chunks for a graphics pipeline, and assembling an on-the-fly graphics pipeline are further shown in FIG. 5, which depicts an example method 500 for the assembly of a GPU program. In FIG. 5, the dashed lines indicate alternative embodiments or method steps.

At 502, a specific shader type is identified or selected. For example, a shader type might be selected from: fetch shader; vertex shader; pixel shader; geometry shader, tessellation shader, or other shader types.

Certain shader types might be available for use with, or required by a particular API and/or GPU being used. In any particular case, any or all shader types may be necessary in order to assemble a proper GPU program; and the order in which shader types are included may or may not be specified by the requirements of the API and/or GPU.

For example, a GPU program for use on one GPU, such as an AMD E4690, may include one each of a fetch shader, a vertex shader, and a pixel shader, and these shader types may or may not be included in a GPU program for use on a different GPU, such as an AMD E8860. In most cases, an on-the-fly shader graphics program can be used regardless of the particular programming requirements or preferences with any particular GPU.

For a given shader type, such as a vertex shader, the method 500 may proceed from 502 to 504. In some cases, for example, as a matter of programming preference, or in order to meet particular requirements of an API and/or GPU, an initial control function instruction can be inserted. For example, an initial control function instruction may be used to initialize or configure a GPU for the particular shader type. In some cases, it may not be necessary or desirable to use an initial control function instruction for a particular shader type.

The method may proceed to 506, either from 504, or directly from 502. At 506, a specific shader instruction type is identified or selected. For example, a shader instruction type might be selected from: ALU shader instructions; vertex fetch shader instructions; texture fetch shader instructions; or other types of shader instruction.

Certain shader instruction types might be available for use with, or required by a particular API and/or GPU being used. In any particular case, any or all shader types may be necessary in order to assemble a proper GPU program; and the order in which shader types are included may or may not be specified by the requirements of the API and/or GPU.

For example, a GPU program for use on one GPU, such as an AMD E4690 may include one each of a concatenated shader chunk pertaining to ALU, vertex fetch, and texture fetch shader instructions, and these shader instruction types may or may not be included in a GPU program for use on a different GPU, such as an AMD E8860.

According to some embodiments, an initial clause may be inserted at 508. For example, an initial clause may be used to initialize the GPU for a particular shader instruction type. Furthermore, at 510, a control instruction may be inserted, such as to provide flow control instructions.

At 512, a shader chunk is inserted pertaining to the specific shader instruction type in 506. The particular shader chunk that is inserted may be determined by a particular request to render a graphics object, such as that found in 402.

For example, if functions pertaining to ambient light are required in order to fulfill a request to render a graphics object, then a pre-complied shader chunk corresponding to ambient light is inserted at 512.

If, in order to fulfill the request to render the graphic object, other shader chunks of the same shader instruction type are required, then, at 514, the method may return to 512. At this iteration, another shader chunk may be inserted. Continuing with the current example, if functions pertaining to diffuse light are required in order to fulfill the request to render the graphics object, then a pre-compiled shader chunk corresponding to diffuse light is inserted at 512, and is concatenated with the previously-inserted ambient light pre-complied shader chunk.

According to some embodiments, it may be necessary or preferred to insert a control instruction between two pre-compiled shader chunks. In this case, the method made proceed from 514 to 510 before proceeding to insert and concatenate a new pre-compiled shader chunk at 512.

According to some embodiments, the method 500 may continue to iterate through 512 and 514 (and possibly 510) until all of the required pre-compiled shader chunks of a particular shader instruction type have been inserted and concatenated.

Once all of the necessary or preferred pre-compiled shader chunks of a particular shader instruction type have been inserted and concatenated, the method may proceed to a different shader instruction type at 516. For example, one pass through 506 may pertain to vertex fetch shader instructions. Subsequently, the method may pass through 516, and return to 506, for the purposes of inserting and concatenating pre-compiled shader chunks pertaining to texture fetch shader instructions.

Once all of the necessary or preferred pre-compiled shader chunks and other associated instructions (such as control/flow instructions) have been inserted and concatenated for a particular type of shader, the method may proceed to a different type of shader type at 518. For example, one pass through 502 may pertain to vertex shaders. Subsequently, the method may pass through 518, and return to 502, for the purposes of inserting concatenated shader chunks pertaining to a pixel shader.

The method ends at 520 after all of the necessary or preferred shader chunks have been inserted and concatenated for each shader type, and each shader instruction type therein.

Figure 6:
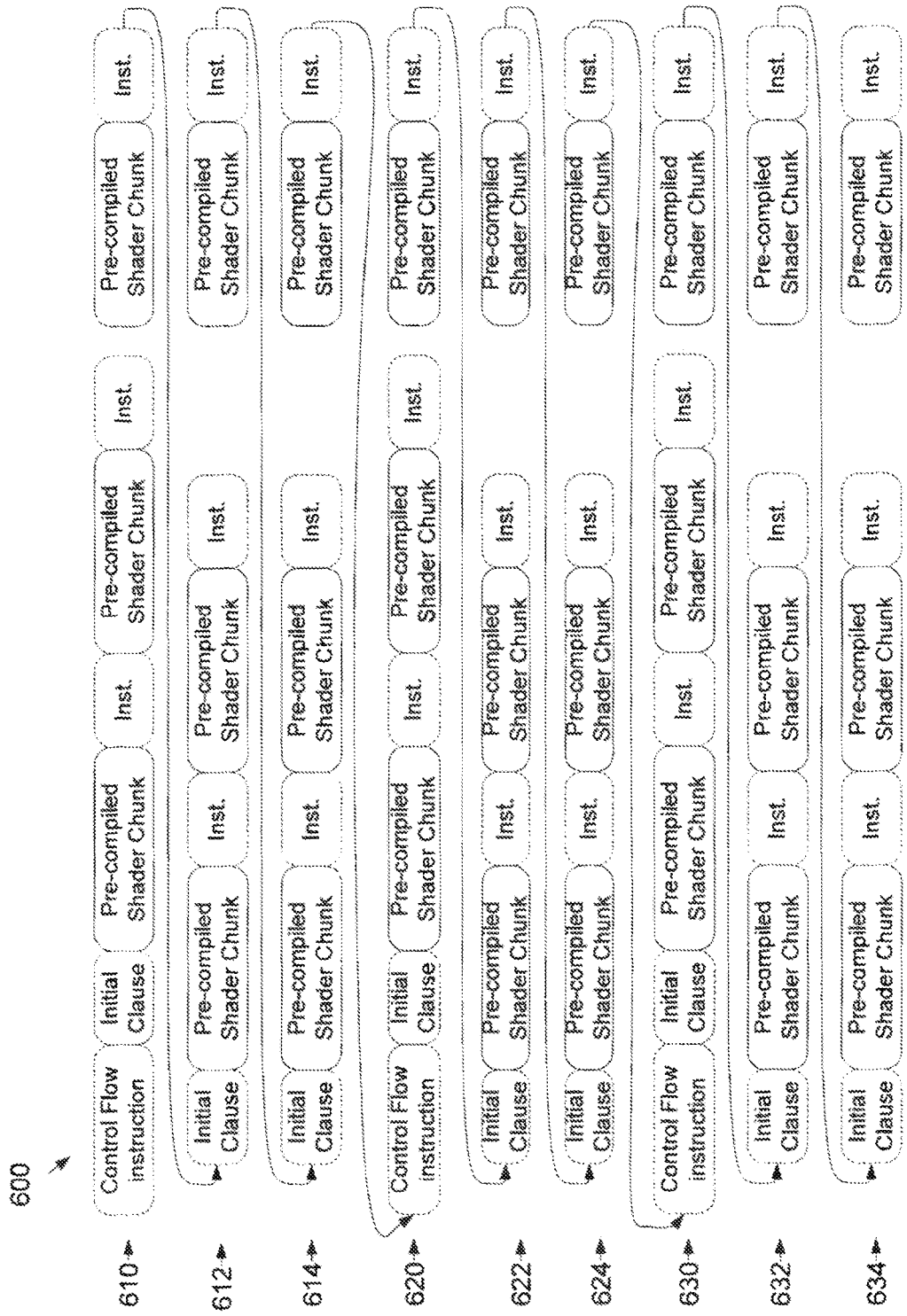
FIG. 6 is a block diagram of an example GPU program or graphics pipeline using pre-compiled shader chunks according to one embodiment; and, FIG. 7 is an example of pseudo-code for the selection and insertion of exemplary pre-compiled shader chunks.

The structure of an example GPU program 600 is shown in FIG. 6. Such a GPU program may be the result of method 500. The rows 610, 620, and 630 may represent the start of a distinct type of shader. For example, 610 may be the start of a fetch shader, 620 may be the start of a vertex shader, and 630 may be the start of a pixel shader.

Furthermore, each row 610 through 634 may pertain to a distinct type of shader instruction. According to some embodiments, each row is a concatenation of all of the pre-compiled shader chunks of a particular shader instruction type, pertaining to a particular shader type. For example, row 610 may comprise all of the pre-compiled shader chunks pertaining to ALU instructions for a fetch shader. Row 612 may comprise all of the pre-compiled shader chunks pertaining to vertex instructions for the fetch shader. Row 614 may comprise all of the pre-compiled shader chunks pertaining to texture instructions for the fetch shader.

The dashed lines in FIG. 6 represent alternative data, some or all of which may or may not be included in any particular embodiment. According to some embodiments, a shader program may be constructed entirely of concatenated pre-compiled shader chunks. According to other embodiments, a shader program may be constructed of pre-compiled shader chunks inter-mixed with other instructions and/or clauses.

The dotted lines in FIG. 6 indicate that not all of a particular row is necessary shown; and that the row length and pattern of each row is merely exemplary.

While the above description provides examples of one or more apparatus, methods, or systems, it will be appreciated that other apparatus, methods, or systems may be within the scope of the claims as interpreted by one of skill in the art.

The invention claimed is:

1. A method for emulating a fixed-function graphics pipeline using a graphics processing unit with a programmable graphics pipeline, comprising:
a processor selecting, based on a conditional logic script that determines which of a set of pre-compiled shader chunks to concatenate to emulate a function of a fixed-function graphics application programming interface, a first pre-compiled shader chunk from the set of pre-compiled shader chunks, wherein the first pre-compiled shader chunk comprises a first plurality of machine code instructions for execution by the graphics processing unit, wherein the first plurality of machine code instructions in the first pre-compiled shader chunk excludes branches and loops;
the processor selecting, based on the conditional logic script, at least one second pre-compiled shader chunk from the set of pre-compiled shader chunks, wherein each at least one second pre-compiled shader chunk comprises a respective plurality of machine code instructions for execution by the graphics processing unit, wherein each respective plurality of machine code instructions in the at least one second pre-compiled shader chunk excludes branches and loops;
based on the conditional logic script, the processor concatenating the first pre-compiled shader chunk with the at least one second pre-compiled shader chunk to form a shader program that excludes branches and loops, wherein the shader program comprises machine code instructions for execution by the graphics processing unit; and
following concatenation of the first pre-compiled shader chunk with the at least one second pre-compiled shader chunk to form the shader program, the graphics processing unit executing the shader program to emulate the fixed-function graphics pipeline.

2. The method of claim 1, wherein each shader chunk corresponds to one and only one fixed-function graphics function.

3. The method of claim 1, wherein the first and at least one second pre-compiled shader chunks are selected according to received requirements for specific graphics functions to be included in the shader.

4. The method of claim 3, wherein the first and at least one second pre-compiled shader chunks are concatenated in order of shader instruction type.

5. The method of claim 3, further comprising rendering a graphics object from model data using the concatenated first shader chunk and at least one second shader chunk.

6. A system for rendering graphics, comprising:
at least one graphics processing unit;
at least one non-transient computer-readable medium storing a set of pre-compiled shader chunks;
a processor, the processor configured to:
 select, based on a conditional logic script that determines which of a set of pre-compiled shader chunks to concatenate to emulate a function of a fixed-function graphics application programming interface, a first pre-compiled shader chunk from the set of pre-complied shader chunks, wherein the first pre-compiled shader chunk comprises a first plurality of machine code instructions for execution by the graphics processing unit, wherein the first plurality of machine code instructions in the first pre-compiled shader chunk excludes branches and loops;
 select, based on the conditional logic script, at least one second pre-compiled shader chunk from the set of pre-compiled shader chunks, wherein each at least one second pre-compiled shader chunk comprises a respective plurality of machine code instructions for execution by the graphics processing unit, wherein each respective plurality of machine code instructions in the at least one second pre-compiled shader chunk excludes branches and loops;
 based on the conditional logic script, concatenate the first pre-compiled shader chunk with the at least one second pre-compiled shader chunk; and,
 generate a shader program that excludes branches and loops from the concatenated shader chunks, wherein the shader program comprises machine code instructions for execution by the graphics processing unit; and
the at least one graphics processing unit configured to execute the shader program to emulate the fixed-function graphics pipeline following concatenation of the first pre-compiled shader chunk with the at least one second pre-compiled shader chunk to form the shader program.

7. The system of claim 6, wherein the first pre-compiled shader chunk and the at least one second pre-compiled shader chunk pertain to a first type of shader instructions and a first shader type.

8. The system of claim 6, wherein the first pre-compiled shader chunk pertains to a different shader instruction type than the at least one second pre-compiled shader chunk.

9. The system of claim 6, wherein the first pre-compiled shader chunk pertains to a different shader type than the at least one second pre-compiled shader chunk.

10. The system of claim 6, wherein the at least one non-transient computer-readable medium further stores model data, and the at least one graphics processing unit is further configured to render a graphics object from the model data using the graphics pipeline.

11. The system of claim 7, wherein the at least one non-transient computer-readable medium comprises a system memory and a graphics memory, the graphics processing unit further configured to store the shader in the graphics memory.

12. A non-transitory computer-readable medium storing first and second computer-executable instructions, the first computer-executable instructions comprising a set of pre-compiled shader chunks, wherein each of the pre-compiled shader chunks comprises a respective plurality of machine code instructions for execution by a graphics processing unit with a programmable graphics pipeline, the second computer-executable instructions comprising a conditional logic script that determines which of a set of pre-compiled shader chunks to concatenate to emulate a function of a fixed-function graphics application programming interface, which when executed by a processor and the graphics processing unit causes the processor to carry out a method for emulating a fixed-function graphics pipeline using the graphics processing unit, the method comprising:
 the processor selecting, based on the conditional logic script, a first pre-compiled shader chunk from the set of pre-compiled shader chunks, wherein the first pre-compiled shader chunk comprises a first plurality of machine code instructions for execution by the graphics processing unit, wherein the first plurality of machine code instructions in the first pre-compiled shader chunk excludes branches and loops;
 the processor selecting, based on the conditional logic script, at least one second pre-compiled shader chunk from the set of pre-compiled shader chunks, wherein each at least one second pre-compiled shader chunk comprises a respective plurality of machine code instructions for execution by the graphics processing unit, wherein each respective plurality of machine code instructions in the at least one second pre-compiled shader chunk excludes branches and loops;
 based on the conditional logic script, the processor concatenating the first pre-compiled shader chunk with the at least one second pre-compiled shader chunk to form a shader program that excludes branches and loops, wherein the shader program comprises machine code instructions for execution by the graphics processing unit; and
 following concatenation of the first pre-compiled shader chunk with the at least one second pre-compiled shader chunk to form the shader program, the graphics processing unit executing the shader program to emulate the fixed-function graphics pipeline.

13. The non-transitory computer-readable medium of claim 12, wherein the first pre-compiled shader chunk pertains to a first type of shader instructions and a first shader type.

14. The non-transitory computer-readable medium of claim 13, further comprising at least one second concatenation of pre-compiled shader chunks, wherein the second pre-compiled shader chunk pertains to at least one second shader instruction type.

* * * * *